United States Patent
Luft et al.

(10) Patent No.: US 6,497,435 B1
(45) Date of Patent: Dec. 24, 2002

(54) ARRANGEMENT FOR CONNECTING TWO TUBULAR ELEMENTS

(75) Inventors: Thomas Luft, Au Am Rhein (DE); Michael Huck, Buhlertal (DE)

(73) Assignee: Aeroquip-Vickers International GmbH, Baden-Baden (DE)

( * ) Notice: Subject to any disclaimer, the term of this patent is extended or adjusted under 35 U.S.C. 154(b) by 0 days.

(21) Appl. No.: 09/469,997

(22) Filed: Dec. 22, 1999

(30) Foreign Application Priority Data

Dec. 23, 1998 (DE) .......................... 198 60 075

(51) Int. Cl.⁷ .............................................. F16L 17/04
(52) U.S. Cl. ..................... 285/360; 285/396; 285/402
(58) Field of Search .................. 285/93, 360, 361–376, 285/396, 402, 377, 362

(56) References Cited

U.S. PATENT DOCUMENTS

| | | | | |
|---|---|---|---|---|
| 242,564 A | * | 6/1881 | Sholder | 285/362 |
| 319,350 A | * | 6/1885 | Titus | 285/362 |
| 609,738 A | * | 8/1898 | Emmitt | 285/361 |
| 919,743 A | * | 4/1909 | Mason | 285/361 |
| 989,251 A | * | 4/1911 | Hall | 285/361 |
| 1,195,433 A | * | 8/1916 | Bailey | 285/361 |
| 1,259,684 A | * | 3/1918 | Vinten | 285/361 |
| 1,591,871 A | * | 7/1926 | Heonrich | 285/361 |
| 1,890,011 A | * | 12/1932 | Wirz et al. | 285/361 |
| 2,529,821 A | * | 11/1950 | Snider | 285/362 |
| 2,797,888 A | | 7/1957 | Sachs | |
| 2,818,279 A | * | 12/1957 | Knapp | 285/362 |
| 4,872,643 A | | 10/1989 | Lo | |
| 4,909,545 A | * | 3/1990 | Hohol | 285/39 |
| 5,087,086 A | * | 2/1992 | Snedeker | 285/361 |
| 5,106,128 A | * | 4/1992 | Dugast et al. | 285/93 |
| 5,149,149 A | * | 9/1992 | Wu | 285/402 |
| 5,219,188 A | | 6/1993 | Abe et al. | |
| 5,285,999 A | | 2/1994 | Scholz | |
| 5,368,338 A | * | 11/1994 | Greene et la. | 285/133.1 |
| 5,636,656 A | | 6/1997 | Hubbard | |
| 5,778,928 A | | 7/1998 | Boland et al. | |
| 6,095,572 A | * | 8/2000 | Ford et al. | 285/361 |
| 6,102,448 A | | 8/2000 | Fixemer et al. | |
| 6,250,688 B1 | * | 6/2001 | Kirby | 285/81 |

FOREIGN PATENT DOCUMENTS

| | | |
|---|---|---|
| DE | 19705222 | 2/1997 |
| WO | WO 93/02313 | 2/1993 |

OTHER PUBLICATIONS

International Search Report in 99123074.9–1252 corresponding to the above–identified U.S. patent application.

* cited by examiner

*Primary Examiner*—Lynne H. Browne
*Assistant Examiner*—Kenn Thompson
(74) *Attorney, Agent, or Firm*—Emch, Schaffer, Schaub & Porcello Co., L.P.A.

(57) ABSTRACT

A coupling assembly for connecting two tubular elements, in particular ends of two tubes of an air-conditioning system, includes two inter-engaging locking parts which, for the purpose of achieving a locked position, can be rotated with respect to one another and can be displaced with respect to one another in the axial direction. The locking parts utilize a bayonet locking feature and include at least two sub-elements, the sub-elements being fixed in the radial direction by two inter-engaging sleeves.

29 Claims, 3 Drawing Sheets

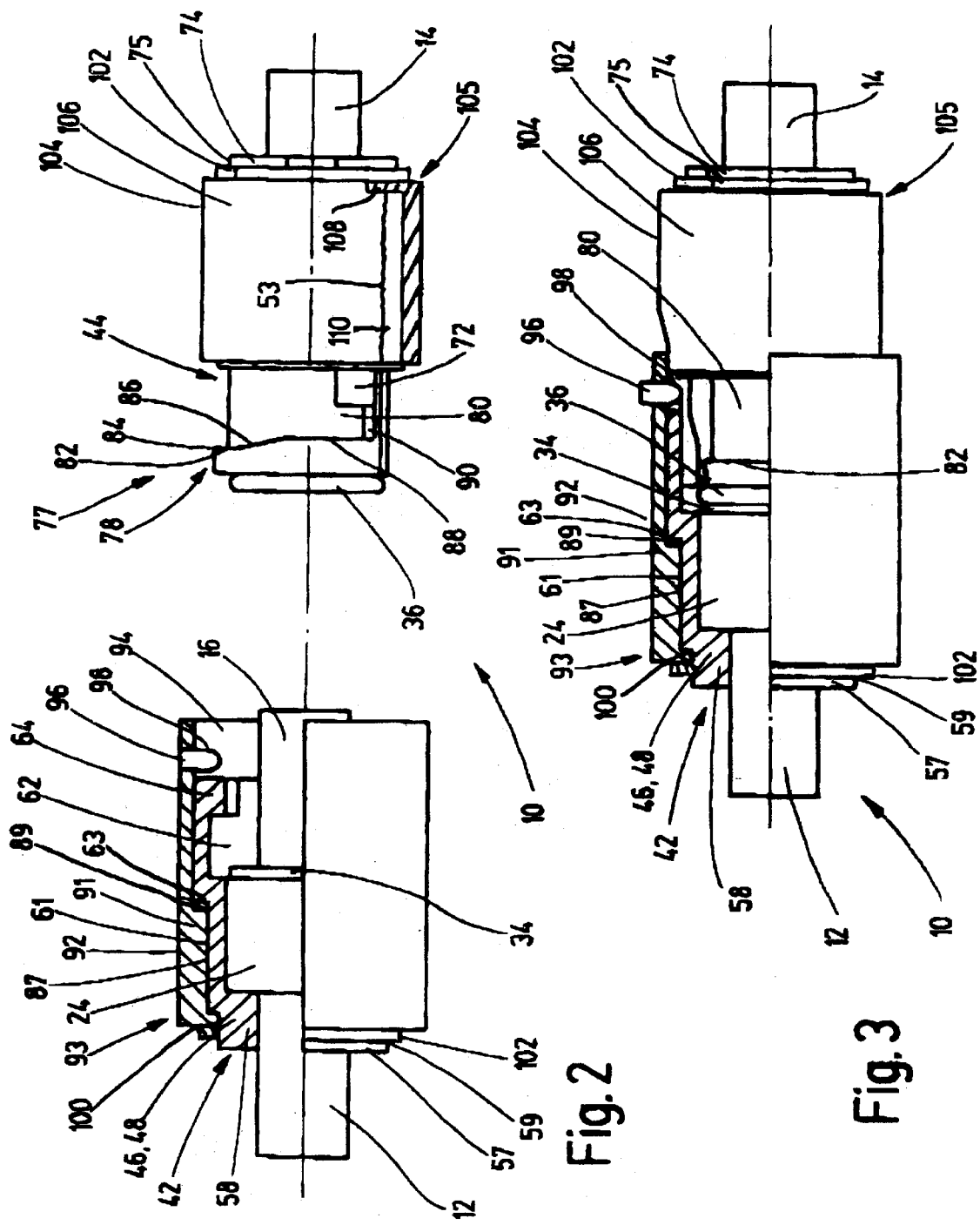

ARRANGEMENT FOR CONNECTING TWO TUBULAR ELEMENTS

The invention relates to a coupling assembly connecting two tubular elements, in particular ends of two tubes of an air-conditioning system, having a bayonet lock in which the inter-engaged locking parts are rotated with respect to one another.

PRIOR ART

It is know, for example for the purpose of producing a coolant circuit, to connect individual tubes to one another at their ends. For this purpose, use is made of bayonet locks designed, for example, as quick-action couplings. The bayonet locks usually have two mutually associated, inter-engaging locking parts which, for the purpose of achieving a locked position, can be rotated with respect to one another and can be displaced with respect to one another in the axial direction.

The disadvantage with the known bayonet locks is that sealing is achieved exclusively via a radially shaped sealing element. In this case, said sealing elements are arranged, usually as sealing discs, between the two ends of the tubular elements. Such a quick-action coupling is unstable in relation to mechanical loading perpendicular to the axis of the two ends.

Furthermore, the sealing discs used each have two sealing surfaces, which butt against corresponding shaped sealing surfaces at the ends of the tubular elements. Said sealing surfaces are arranged in a manner radially offset with respect to the longitudinal center axis of the tubular elements, which is disadvantageous, in particular, if a pressurized medium is to be conveyed through the tubular elements. Furthermore, the size and the three-dimensional extent of the sealing surface is a measure of the pressure stability of such a seal; that is to say, the sealing surfaces are enlarged in the radial direction for the purpose of increasing this stability in the case of the known bayonet locks. The coupling is thus widened in the radial direction, and this results in a greater amount of space being required.

Also known are bayonet locks which, for the purpose of overcoming the above disadvantages of radial sealing elements, have axially shaped seals. For this purpose, usually one end of the tubular element is widened, in terms of its internal radius, to the external radius of the second tubular element. The two elements are then connected to one another axially. The two ends are thus designed as sealing elements, there inner or outer surface forming the sealing surface of the seal. This results, on the one hand, in an increase in stability of the bayonet lock in relation to transverse forces and, on the other hand, in an increase pressure stability as a result of the enlargement and the axial alignment of the sealing surface. The disadvantage is that, in the case of the known bayonet locks with an axial seal, specially formed tools are to be used, in part, for the purpose of releasing the connection.

It is also disadvantageous, in the case of the previously known bayonet locks, that, for fixing the coupling elements axially at the ends of the tubular elements, use is made of, in part, high-outlay arrangements, and that high outlay is involved for the purpose of fitting such a coupling element.

The object of the invention is to provide a coupling assembly of the generic type which is of straight forward design and in which it is possible to ensure good sealing action with low forces.

A coupling assembly having a bayonet-type locking feature is proposed in order to achieve this object. The coupling assembly has two locking parts each of which comprises two sub-elements. These sub-elements are fixed in the radial direction by two inter-engaging sleeves. It is possible to engage the lock at the ends of two tubular elements, and to remove the lock, without using an additional tool. Thus, it is possible to manually disassemble the coupling assembly. Since the locking parts each comprises a plurality of, preferably two sub-elements, the locking parts may also advantageously be subsequently fitted to, and removed from, a pipeline which has already been laid. In this case, the sub-elements of the locking parts are preferably configured such that they butt against one another in a planar manner and are fixed in position by the sleeves.

A development of the invention provides that the sleeves can be fixed in the axial direction by, in each case, one securing ring. A preferred embodiment provides that, when the locked position has been reached, this is indicated by a radial displacement of a moveable pin which is arranged in one of the inter-engaging sleeves.

A further preferred configuration of the invention provides that a first locking part comprises a sleeve into which a plug-in section of the second locking part can be latched. This achieves, in a straight forward manner, a positively and frictionally locking connection of the two locking parts to one another.

Furthermore, a preferred configuration of the invention provides that a sealing element is designed as an axial element which, when the components of the assembly are locked, is compressed in the axial direction. For this purpose, the sealing element preferably has shaped portions which can be displaced axially by the sealing surfaces without the latter being deflected radially in the process. The forces which are to be overcome by the axial compression of the shaped portions during transfer of the locking components into the locked position may be used simultaneously during unlocking of the bayonet lock, with the result that the forces which have to be applied from the outside for the purpose of releasing the assembly may be relatively low. As a result, it is also possible for the lock to be locked and unlocked without any additional tools.

Further advantageous configurations of the invention can be gathered from the rest of the features mentioned in the claims.

DESCRIPTION OF THE DRAWINGS

The invention is explained in more detail hereinbelow, by way of an exemplary embodiment, with reference to the drawings, in which:

FIG. 2 shows an elevational view, partly in section, of the coupling assembly according to FIG. 1 in an unlocked position with the components separated;

FIG. 3 shows an elevational view, partly in section, of the coupling assembly in a locked position.

DESCRIPTION OF THE PREFERRED EMBODIMENT

Figure 1:
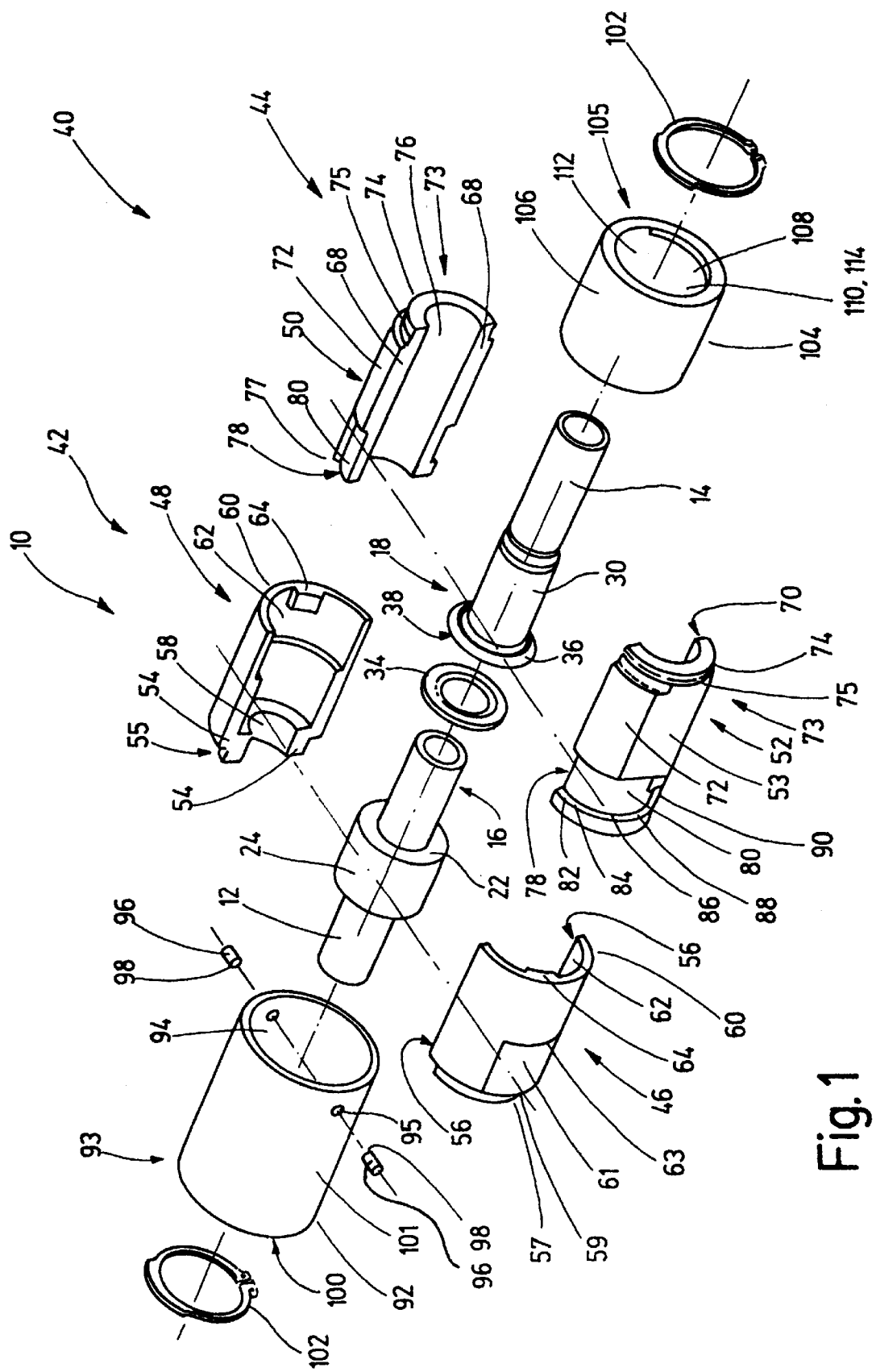
FIG. 1 shows an exploded perspective view of an exemplary embodiment of the coupling assembly according to the invention.

FIG. 1 illustrates an exploded illustration of a coupling assembly 10 for connecting two tubular elements, namely, a first tube 12 and second tube 14, each having end portions 16 and 18, respectively, to be joined together. The tube end portion 16 has a first sealing surface 22, which is formed by a flange 24. In this case, the sealing surface 22 forms a radial annular surface.

The end portion 18 of the second tube 14 has a widened section 30, which is designed such that an internal diameter of the widened section 30 is of essentially the same size as an external diameter of the end 16 of the tube 12. This ensures that the end 16 of the first tube 12 can be displaced axially, or pushed, into widened section 30 of the second tube 14. On its end side, the end 18 of the tube 14 has a disc-like flange 36 which forms an annular sealing surface 38. The annular sealing surfaces 22 and 38 are thus located opposite one another at an axial distance apart and parallel to one another.

Also provided is a sealing element 34 of essentially annular design, the internal diameter of the sealing element 34 being approximately of the same size as the external diameter of the end 16 of the tube 12. As a result, the sealing element 34 can be pushed onto the end 16. Once the tube 14 has been plugged on, the sealing element 34 is thus positioned between the radial, annular sealing surfaces 22 and 38 and butts against said sealing surfaces 22, 38 or is clamped between said sealing surfaces 22, 38.

The arrangement 10 further comprises a bayonet lock 40 which comprises two locking parts 42 and 44. The locking part 42 comprises two sub-elements 46 and 48 which are each of approximately semi-circular design. Each of the sub-elements 46 and 48 has a planar contact surface 54 and 56, these surfaces abutting against one another when they are subsequently positioned on the tubes 12 and 14. For the purpose of fixing the two sub-elements 46 and 48, use is made of a sleeve 92, of which the internal diameter is of the same size as the external diameter of the first locking part 42. For the purposes of the rest of the description, it is assumed that the locking part 42 forms a unit comprising the sub-elements 46 and 48.

The locking part 42 has an axial through-opening 58, of which the internal diameter corresponds to the external diameter of the tube 12, the term "corresponds", in the context of the present invention, being understood as meaning the same diameters. Furthermore, the locking part 42, on the outside of the region which contains the axial through-opening 58, has a tapered section 57 with radial depression 59. The depression 59 can receive a securing ring 102, which fixes the axial position of the sleeve 92. For this purpose, the sleeve 92 has at one end 93, on an inner surface 94, a protrusion 100 which is preferably shaped radially. The protrusion 100 has an internal diameter which is smaller than the external diameter of the securing ring 102 and which corresponds to the external diameter of the tapered section 57. This fixes the axial position of the sleeve 92 relative to the first locking part 42.

The sleeve 92 also has a protrusion 91, which extends out from the inner surface 94, parallel to the axis of the tube 12, and has a groove or shoulder 89. The protrusion 91 has an inner surface 87 which is configured such that it is located on a lateral surface 61 of the locking part 42 in a positively locking manner and thus prevents radial rotation of the sleeve 92 and the locking part 42. The lateral surface 61 also has a groove or shoulder 63 on which, once the bayonet lock 40 has been fitted, the groove/shoulder 89 of the sleeve 92 is located, with the result that the sleeve 92 is arranged in a defined position in relation to the locking part 42.

The locking part 42 further comprises a sleeve 60 with a sleeve inner surface 62. Radially inwardly directed protrusions 64 are arranged on the sleeve inner surface 62. The sleeve 60 forms, in practice, an interior of the bayonet lock 40.

The locking part 44 likewise comprises two essentially semi-circular sub-elements 50 and 52. Each of the sub-elements 50 and 52 has two planar contact surfaces 68 and 70, which abut against one another when the locking part 44 is placed in position. It is thus also possible for the locking part 44 to be subsequently placed in position on the tube 14. The locking part 44 is fixed in the radial direction by a sleeve 104. The sleeve 104 has an internal diameter which corresponds to the external diameter of the locking part 44. The sleeve 104 also has a lateral surface 106, of which the diameter corresponds to the internal diameter of the first sleeve inner surface 94.

The locking part 44 has a through-opening 76, of which the internal diameter corresponds essentially to the external diameter of the widened section 30 of the tube 14. The locking part 44 can thus be moved axially in relation to the widened section 30 and the flange 36.

Furthermore, at its end 73, the locking part 44 has a tapered section 74 with a radial depression 75. In this case, the depression 75 may, again, receive a securing ring 102, of which the external diameter, again, is greater than the internal diameter of a protrusion 108 which extends radially inwards at the end 105 of the second sleeve 104. The internal diameter in the region of the sleeve 104 which has the protrusion 108 corresponds to the external diameter of the tapered section 74 of the locking part 44. This fixes the sleeve 104 in the axial direction.

The sleeve 104 also has a protrusion 110, which extends out from an inner surface 112, parallel to the axis of the tube 14. The protrusion 110 has an inner surface 114 which is designed such that it is located on a lateral surface 53 of the locking part 44 in a positively locking manner and thus prevents radial rotation of the sleeve 104 and of the locking part 44.

Furthermore, in the region of a plug-in section 77, the sub-element 50 of the locking part 44 has a depression 78, of which the lateral surface 80 corresponds to the internal diameter of the protrusion 64 of the first locking part 42.

In the region of the plug-in section 77, the sub-element 52 has a radially running annular surface 82. The annular surface 82 has a first section 84, which runs parallel in relation to the sealing surfaces 22 and 38 and passes into a second section 86, which runs conically or obliquely in relation to the sealing surfaces 22 and 38, at an angle to a plane perpendicular to the axis of the tubes 12 and 14. Finally, the section 86 is followed by an again parallel section 88, which terminates at an axially running, stop-forming protrusion 90.

The overall axial length of the plug-in section 77 is such that, when it is plugged into the sleeve 60 of the locking part 42, it can engage behind the protrusions 64 by way of its annular surface 82. The internal diameter of the plug-in section 77 is selected to be greater than the external diameter of the flanges 24 and 36.

The first sleeve 92 also has at least one bore 95, in which there is arranged a radially displaceable pin 96 which serves as an indicator element. On its radially inwardly arranged side, the pin 96 has a rounded section 98. In the unlocked position, the rounded section 98 projects beyond the inner surface 94 of the sleeve 92.

FIG. 2 shows the coupling assembly 10, in a partially sectioned illustration, in an unlocked position, while FIG. 3 shows the coupling assembly 10 in a locked position. The same parts as in FIG. 1 are provided with the same designations, so they will not be explained again.

FIG. 2 shows clearly that, in the unlocked state, the pin 96 is displaced radically inwards to such an extent that it does not project beyond the outer surface of the sleeve 92. The pin 96 has thus been fully retracted into the bore 95.

In the locked position, which is shown in FIG. 3, the end 16 of the tube 12 engages in the widened section 30 of the tube 14. At the same time, the plug-in section 77 of the locking part 44 engages in the sleeve 60 of the locking part 42. With reference to the steps which are explained in even greater detail with reference to FIGS. 4a to 4c, the locking parts 42 and 44 are rotated with respect to one another during transfer from the unlocked position, according to FIG. 2, into the locked position according to FIG. 3, in which case said locking parts simultaneously advance towards one another in the axial direction. The axial advancement of the locking parts 42 and 44 is designed by the progression of the annular surface 82. When the plug-in section 77 is plugged into the sleeve 60, the protrusions 64 engage in the region of the depression 78 of the plug-in section 77. Upon rotation of the locking part 44, the protrusion 64 then abuts against the annular surface 82.

The locking parts 42 and 44 are rotated with respect to one another until such time as the protrusion 64 can be guided along the annular surface 82. This achieves the situation where the locking parts 42 and 44 are moved towards one another in the axial direction in the conically running section 86. The definitive locked position is then reached when the protrusion 64 abuts against the protrusion 90. In the locked position, the sleeve 104 likewise engages in the sleeve 92. In the axial advancement of the locking parts 42 and 44 towards one another during rotation, the sleeve 104 reaches that region of the sleeve 92 in which the pin 96 is arranged. As rotation of the locking parts 42 and 44 with respect to one another continues, during which time the rounded section 98 of the pin 96 slides along the ramp 72, the pin 96 is displaced radially outwards, with the result that it projects beyond the outer surface/lateral surface 101 of the sleeve 92. The pin 96 thus serves for indicating the locked position of the coupling assembly 10. If this locked position is correct, it is possible to feel or to see the pin 96.

While the locking parts 42 and 44 move towards one another in the axial direction, and thus the flanges 24 and 36 advance towards one another, the sealing element 34 comes into abutment with the sealing surfaces 22 and 38.

Figure 4A:
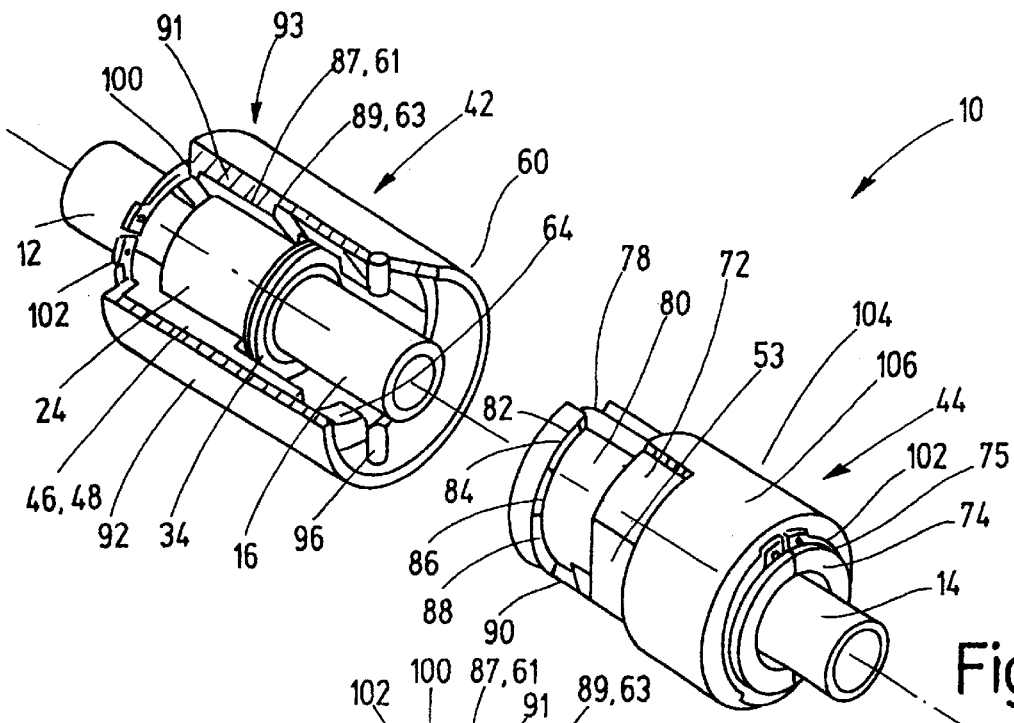
FIG. 4a, FIG. 4b and FIG. 4c show, in schematic perspective views, individual steps for reaching the locked position.
Figure 4B:
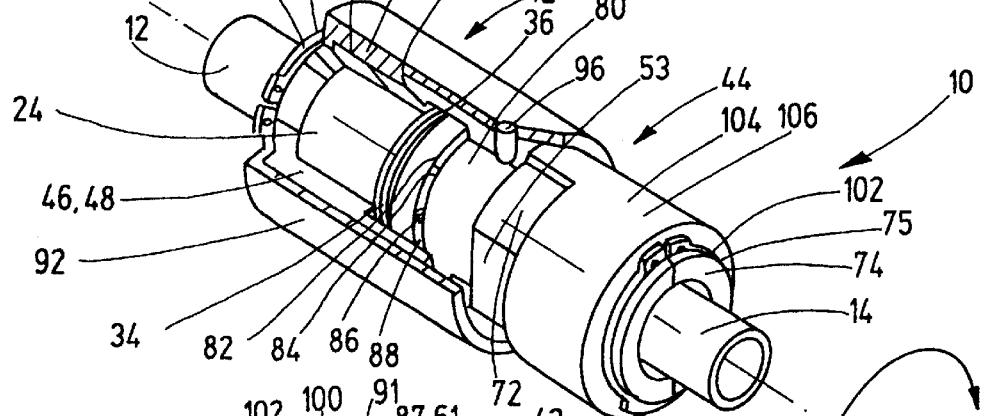
Figure 4C:
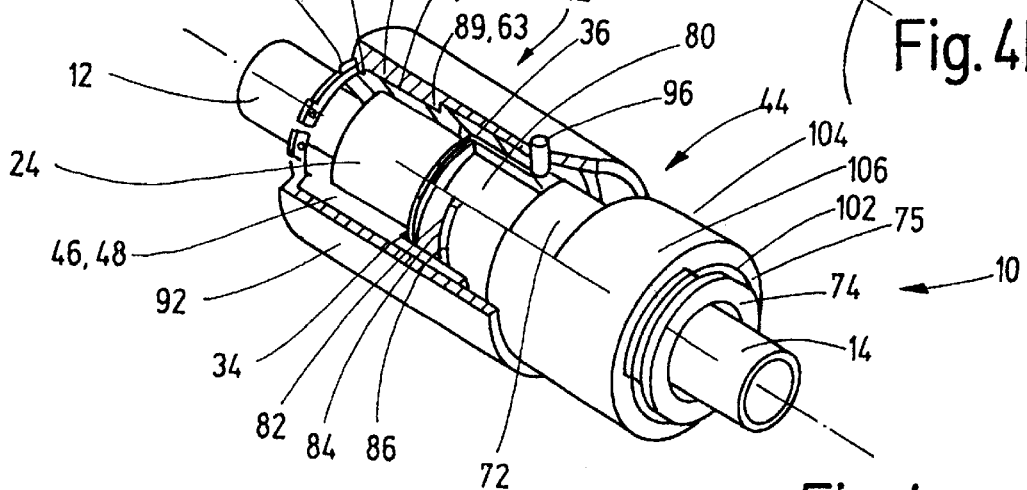

FIGS. 4a to 4c show graphically once again the guidance of the coupling assembly 10, that is to say the locking parts 42, 44 from the unlocked position to the locked position. FIG. 4a is the unlocked position with the locking part 42 arranged on the end 16 of the tube 12 and the locking part 44 arranged on the end 18 of the tube 14.

In accordance with FIG. 4b, the locking part 44 is introduced into the sleeve 60 of the locking part 42 by way of its plug-in section 77. At the same time, the end 16 of the tube 12 passes into the widened section 30 of the tube 14 and the sleeve 104 passes into the sleeve 92. The locking part 44 is pushed into the locking part 42 in a defined position, in which the protrusion 64 can engage in the depression 78 and be pushed through in the axial direction there. Once the protrusion 64 has moved axially along the lateral surface 80 of the depression until it is level with the annular surface 82, the locking parts 42 and 44 are rotated with respect to one another. In this case, the protrusion 64 is guided along the annular surface 82, with the result that—as has already been explained—axial movement additionally takes place at the section 86. During rotation of the locking parts 42, 44 with respect to one another, the rounded section 98 of the pin 96 slides on the ramp 72 and is thus pushed radially outwards through the bore 95. The section 88 of the annular surface 82, in turn, runs parallel to the rotary movement (i.e. parallel to a plane perpendicular to the axis of the tubes 12 and 14), with the result that there is no more axial movement. The protrusion 64 is guided as far as the protrusion 90 and abuts against the latter without stressing. Rotation of the locking parts 42 and 44 with respect to one another in the opposite direction, and thus unlocking of the coupling assembly 10, can take place if the protrusion 64 is guided into the region of the conically running section 86 again. Since the sealing element 34 usually consists of an elastic material which is compressed/pressed together in the axial direction during locking, it is thus possible to provide a restoring force for the unlocking operation. The operation of unlocking the assembly is thus assisted in the region of the conically running section 86, with the result that there is no need for any additional tools.

We claim:

1. An assembly for connecting the ends of two tubes, said assembly having two inter-engaging locking parts rotatable with respect to one another from an unlocked to a locked position and displaced with respect to one another in the axial direction, characterized in that the locking parts each comprise at least two sub-elements, said sub-elements being fixed in the radial direction by two inter-engaging sleeves.

2. The assembly according to claim 1, characterized in that said sleeves have ends and radially inwardly directed protrusions at said ends.

3. The assembly according to claim 2, characterized in that the locking parts have ends with tapered sections.

4. The assembly according to claim 3, characterized in that each of said tapered sections has a radially running depression.

5. The assembly according to claim 4, characterized in that each of said sleeves is fixed in the axial direction by a securing ring, engaged in each of said depressions.

6. The assembly according to claim 1, characterized in that one of said sleeves has at least one bore with a pin which is mounted in a radially movable manner.

7. The assembly according to claim 6, characterized in that said pin is displacable radially upon the locking parts being rotated with respect to one another.

8. The assembly according to claim 1, further including a sealing element positioned between said locking parts designed to take axial compression during locking of said locking parts.

9. The assembly according to claim 1, characterized in that said ends of said tubes have flanges with sealing surfaces.

10. The assembly according to claim 9, characterized in that, said flanges have annular surfaces which are remote from the sealing surfaces, said annular surfaces abutting against the locking parts preventing axial movement of each said tube relative to its associated locking part.

11. The assembly according to claim 1, characterized in that the sleeves, parallel to the axis of the tubes, have protrusions with inner surfaces and wherein said locking parts have lateral surfaces which abut said inner surfaces of said protrusions in a positively locking manner.

12. An assembly for connecting an end of an axially extending first tube to the opposing end of a second tube comprising (a) a first sealing surface and a first engagement abutment on said first tube;

(b) a second sealing surface and a second engagement abutment on said second tube;

(c) a first connector member encircling a portion of said first tube and extending from a first end to a second open end, said first connector member having a first stop engaged to said first engagement abutment and an inwardly extending protrusion adjacent said second open end; said first connector member having first and second mating sections and a sleeve encircling at least a portion of said first connector member to prevent radial movement of said first and second mating sections; and (d) a second connector member encircling a portion of said second tube, said second connector member having (i) a first end receivable in said first connector open end, (ii) a retention wall adjacent said first end engageable with said inwardly extending protrusion upon relative rotation between said first and second connector members end and (iii) a second stop engaged to said second engagement abutment.

13. A coupling assembly according to claim 12 wherein said second connector member has an outwardly facing ramp and wherein said sleeve has an aperture, and further including a pin in said aperture, engagement of said first connector member to said second connector member, upon relative rotation therebetween, causing said pin to be radially outwardly displaced by said ramp.

14. A coupling assembly according to claim 12 wherein said retention wall includes a surface engageable with said inwardly extending protrusion, said surface including a segment disposed at an angle relative to a plane perpendicular to said axis, said segment cooperating with said protrusion upon relative rotation toward the engaged position to move said first connector member toward said second connector member.

15. A coupling assembly for connecting end portions of first and second tubes, said end portions extending along an axis comprising:

(a) a first locking part extending from first end to a receiving end and encircling said first tube end portion, said first locking part having (i) multiple sections movable radially from an open spaced apart disengaged position to a closed position engaged to one another, (ii) a first internal surface adjacent said first end engaged to said first tube end portion, (iii) a second internal surface adjacent said receiving end spaced radially outwardly from said first tube end portion and (iv) a protrusion extending inwardly from said second internal surface; and (b) a second locking part encircling said second tube end portion and extending from a leading end having an exterior sized to be received in said first locking part receiving end to a trailing end, said second locking part exterior having (i) a recess sized to receive said protrusion upon movement of said second locking part leading end into said first locking part receiving end, said recess having a first portion extending to said leading end and a second portion extending in a circumferential direction from said first portion and (ii) an abutment outwardly of said recess between said second portion and said leading end, said first locking part protrusion engageable with said abutment upon relative rotation between said first locking part an said second locking part.

16. The coupling assembly according to claim 15 wherein at least a portion of said abutment is disposed at an angle relative to a plane perpendicular to said axis to move said first and second locking parts axially toward one another upon rotation of said protrusion toward into said recess second portion.

17. The coupling assembly according to claim 15 further including a sleeve encircling said first locking part to hold said multiple sections together.

18. The coupling assembly according to claim 15 wherein said first locking part has an exterior surface defining (i) in part a cylindrical portion and (ii) in part a non-cylindrical portion and further including a sleeve encircling said first locking part to hold said multiple sections together, said sleeve having an internal surface with (iii) a first portion engaged to said cylindrical portion and a second portion engaged to said non-cylindrical portion to prevent rotation of said sleeve relative to said first locking part.

19. The coupling assembly according to claim 18 wherein said sleeve has a radial aperture and further including a pin extending through said aperture, said pin being moveable from an inward position when said second tube and second locking part are disengaged from said first locking part and first tube to a radially outward position when said second tube and second locking part are engaged to said first locking part and said first tube.

20. The coupling assembly according to claim 15 wherein said second locking part has multiple sections moveable radially from an open spaced apart disengaged position to a closed position engaged to one another.

21. The coupling assembly according to claim 20 further including a second sleeve encircling said second locking part to hold said second locking part multiple sections together.

22. The coupling assembly according to claim 20 wherein said second locking part has an exterior surface defining (i) in part a cylindrical portion and (ii) in part a non-cylindrical portion and further including a sleeve encircling said second locking part to hold said second locking part multiple sections together, said sleeve having an internal surface with (iii) a first portion engaged to said second locking part cylindrical portion and a second portion engaged to said second locking part non-cylindrical portion to prevent rotation of said second sleeve relative to said second locking part.

23. The coupling assembly according to claim 22 wherein said sleeve has a radial aperture and further including a pin extending through said aperture, said pin being moveable from an inward position when said second tube and second locking part are disengaged from said first locking part and first tube to a radially outward position when said second tube and second locking part are engaged to said first locking part and said first tube.

24. The coupling assembly according to claim 15 further including an annular sealing element sealingly engaged to said first and second tubes.

25. The coupling assembly according to claim 24 wherein at least a portion of said second locking part abutment is disposed at an angle relative to a plane perpendicular to said axis to move said first and second locking parts axially toward one another upon rotation of said protrusion toward said recess second portion to sealingly engage said annular sealing element to said first and second tubes.

26. A coupling assembly for connecting end portions of first and second tubes, said end portions extending along an axis comprising:

(a) a first locking part extending from first end to a receiving end and encircling said first tube end portion, said first locking part having (i) multiple sections movable radially from an open spaced apart disengaged position to a closed position engaged to one another, (ii) a first internal surface adjacent said first end engaged to said first tube end portion, (iii) a second internal surface adjacent said receiving end spaced radially outwardly from said first tube end portion and (iv) a protrusion extending inwardly from said second internal surface;

(b) a second locking part encircling said second tube end portion and extending from a leading end having an exterior sized to be received in said first locking part receiving end to a trailing end, said second locking part having (i) multiple sections movable radially from an open spaced apart disengaged position to a closed position engaged to one another, a recess sized to receive said protrusion upon movement of said second locking part leading end into said first locking part receiving end, said recess having a first portion extending to said leading end and a second portion extending in a circumferential direction from said first portion and (ii) an abutment between said recess second portion and said leading end, said first locking part protrusion engageable with said abutment upon relative rotation between said first locking part and said second locking part;

(c) a first sleeve encircling and holding said first locking part multiple sections together; and (d) a second sleeve encircling and holding said second locking part multiple sections together.

27. The coupling assembly according to claim 26 wherein said second locking part has an exterior surface defining (i) in part a cylindrical portion and (ii) in part a non-cylindrical portion and wherein said second sleeve has an internal surface with (iii) a first portion engaged to said second locking part cylindrical portion and a second portion engaged to said second locking part non-cylindrical portion to prevent rotation of said second sleeve relative to said second locking part.

28. The coupling assembly according to claim 27 wherein said first sleeve has a radial aperture and further including a pin extending through said aperture, said pin being engageable with said second locking part exterior surface non-cylindrical portion upon insertion of said second locking part into first locking part receiving end and moveable on said non-cylindrical portion toward said second locking part exterior surface cylindrical portion upon rotation of said second locking part relative to said first sleeve to urge said pin outwardly.

29. The coupling assembly according to claim 26 wherein said second tube has an engagement end with an internal size sufficiently large to receive therein said first tube connecting end portion.

* * * * *